United States Patent
Iwashita et al.

(10) Patent No.: US 12,168,738 B2
(45) Date of Patent: Dec. 17, 2024

(54) ADHESIVE RESIN COMPOSITIONS AND LAMINATES

(71) Applicant: MITSUI CHEMICALS, INC., Tokyo (JP)

(72) Inventors: Akihiko Iwashita, Harrison, NY (US); Ryohei Shiga, Ichihara (JP); Motoyasu Yasui, Chiba (JP); Yoshisada Fukagawa, Ichihara (JP); Kyoko Kobayashi, Chiba (JP); Masahiko Okamoto, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 657 days.

(21) Appl. No.: 17/419,640

(22) PCT Filed: Jan. 6, 2020

(86) PCT No.: PCT/JP2020/000060
§ 371 (c)(1),
(2) Date: Jun. 29, 2021

(87) PCT Pub. No.: WO2020/145239
PCT Pub. Date: Jul. 16, 2020

(65) Prior Publication Data
US 2022/0081598 A1   Mar. 17, 2022

(30) Foreign Application Priority Data

| Jan. 7, 2019 | (JP) | 2019-000636 |
| Feb. 5, 2019 | (JP) | 2019-018512 |
| Dec. 25, 2019 | (JP) | 2019-234236 |

(51) Int. Cl.
| C09J 123/12 | (2006.01) |
| B32B 7/12 | (2006.01) |
| B32B 27/08 | (2006.01) |
| C09J 123/06 | (2006.01) |
| C09J 123/18 | (2006.01) |
| C09J 151/06 | (2006.01) |

(52) U.S. Cl.
CPC .............. *C09J 123/12* (2013.01); *B32B 7/12* (2013.01); *B32B 27/08* (2013.01); *C09J 123/06* (2013.01); *C09J 123/18* (2013.01); *C09J 151/06* (2013.01); *B32B 2250/05* (2013.01); *B32B 2250/24* (2013.01); *B32B 2439/46* (2013.01); *B32B 2439/70* (2013.01)

(58) Field of Classification Search
CPC combination set(s) only.
See application file for complete search history.

(56) References Cited

U.S. PATENT DOCUMENTS

| 5,789,484 | A  | * | 8/1998 | Kan | .............. C08L 53/025 |
| | | | | | 525/240 |
| 2010/0183881 | A1 | | 7/2010 | Yasui et al. | |
| 2012/0220728 | A1 | * | 8/2012 | Uekusa | ................. C08L 23/20 |
| | | | | | 525/240 |
| 2018/0334593 | A1 | | 11/2018 | Shiga et al. | |
| 2020/0230934 | A1 | | 7/2020 | Yamasaki et al. | |

FOREIGN PATENT DOCUMENTS

| JP | 3721265 B2 | 5/1999 |
| JP | 2015-218182 A | 12/2015 |
| JP | 2016-026380 A | 2/2016 |
| JP | 2019-137853 A | 8/2019 |
| WO | WO-2007/086434 A1 | 8/2007 |
| WO | WO-2017/104731 A1 | 6/2017 |
| WO | WO-2018/155448 A1 | 8/2018 |

* cited by examiner

*Primary Examiner* — Ramsey Zacharia
(74) *Attorney, Agent, or Firm* — Foley & Lardner LLP

(57) ABSTRACT

An adhesive resin composition including a propylene polymer (A), an ethylene polymer (B), and a thermoplastic resin (C) including a copolymer containing not less than 60 mol % and not more than 99 mol % of structural units derived from 4-methyl-1-pentene, and not less than 1 mol % and not more than 40 mol % of structural units derived from a C2-C20 α-olefin other than 4-methyl-1-pentene, these structural units representing total 100 mol % of the copolymer, the thermoplastic resin (C) showing a melting point Tm of not more than 199° C. or showing substantially no melting point as analyzed with a differential scanning calorimeter (DSC). The total of the components (A), (B) and (C) includes 45 to 75 parts by mass of the component (A), 5 to 20 parts by mass of the component (B), and 15 to 45 parts by mass of the component (C).

21 Claims, No Drawings

ADHESIVE RESIN COMPOSITIONS AND LAMINATES

CROSS-REFERENCE TO RELATED APPLICATIONS

The present application claims priority under 37 U.S.C. § 371 to International Patent Application No. PCT/JP2020/000060, filed Jan. 6, 2020, which claims priority to and the benefit of Japanese Patent Application No. 2019-000636, filed Jan. 7, 2019, Japanese Patent Application No. 2019-018512, filed Feb. 5, 2019, and Japanese Patent Application No. 2019-234236, filed Dec. 25, 2019. The contents of these applications are hereby incorporated by reference in their entireties.

TECHNICAL FIELD

The present invention relates to adhesive resin compositions and laminates. More particularly, the present invention relates to an adhesive resin composition capable of favorably bonding a polymethylpentene resin together with a polar resin or a polyolefin resin such as a polypropylene resin. The present invention also relates to a laminate that has an adhesive layer including such an adhesive resin composition.

BACKGROUND ART

The recent trend for shorter cooking time has increased the distribution of cooked foods and semi-cooked foods that can be eaten only after heated in a microwave oven or the like. Containers used for such cooked foods and the like are frequently heated directly in a microwave oven or the like and therefore require high heat resistance. Further, containers used for cooked foods and other similar foods are required to have high oxygen barrier properties in order to reduce the amounts of food loss.

To meet such demands, development is underway of heat resistant and oxygen barrier containers that are obtained by stacking together a polymethylpentene resin having high heat resistance and a barrier resin having high oxygen barrier properties such as an ethylene-vinyl alcohol copolymer (EVOH) resin or a polyamide resin.

Meanwhile, multilayered structures including a polyketone resin have been studied for use in oil pipes and gas pipes. In these applications, the polyketone resins are required to be combined with materials that are high in heat resistance and are lightweight.

Further, polycarbonate resins are used for automobile headlight covers and the like on account of their good transparency and appearance. In these applications, a demand for weight reduction requires that the polycarbonate resin be combined with a material that is transparent and lightweight.

From the background discussed above, an attention has been drawn to combining a highly heat resistant, transparent and lightweight polymethylpentene resin with other resins.

Patent Literature 1 discloses a 4-methyl-1-pentene polymer composition that includes a 4-methyl-1-pentene polymer and a modified polyolefin resin which is a mixture of an unsaturated carboxylic acid-modified α-olefin polymer in which the α-olefin is selected from the group consisting of propylene, butene-1 and 4-methyl-1-pentene, and an unsaturated carboxylic acid-modified ethylene-α-olefin copolymer (B-2). According to the description, the composition exhibits good adhesion to nylons.

Patent Literature 2 discloses a battery component film that includes a layer formed of a resin composition (X) including a 4-methyl-1-pentene polymer and a polypropylene. It is described that the battery component film may be produced as a tab lead film or the like without a crosslinking step and is comparable or superior to the conventional products in heat resistance, flexibility, bond strength with respect to electrodes, and interlayer bond strength.

Patent Literature 3 discloses a thermoplastic resin composition that includes a polyolefin polymer, one or more selected from the group consisting of unsaturated carboxylic acids and unsaturated carboxylic acid derivatives, and an organic peroxide. According to the description, the composition has excellent adhesion with respect to, for example, polar resins such as ethylene-vinyl alcohol copolymers, nylons and polyesters, and nonpolar resins such as polyethylenes, polypropylenes, poly-1-butenes and poly-4-methyl-1-pentenes.

Patent Literatures 4 to 7 describe laminates that include an adhesive layer including a carbodiimide-modified polypropylene and a layer including any of a polyketone, a polycarbonate and a fluororesin as an adherend to which the adhesive layer is bonded.

CITATION LIST

Patent Literature

Patent Literature 1: Japanese Patent No. 3721265
Patent Literature 2: JP-A-2016-026380
Patent Literature 3: JP-A-2015-218182
Patent Literature 4: WO 2017/104731
Patent Literature 5: WO 2018/155448
Patent Literature 6: WO 2007/086434
Patent Literature 7: JP-A-2019-137853

SUMMARY OF INVENTION

Technical Problem

Unfortunately, it is extremely difficult to bond a nonpolar low-wettability polymethylpentene resin together with a polar resin such as an ethylene-vinyl alcohol copolymer resin or a polyamide resin. Another problem is that stretching after thermoforming significantly lowers the bond strength between the layers. Moreover, the interlayer bond strength is significantly lowered also by retort treatment.

An extreme difficulty is also encountered when bonding a nonpolar low-wettability polymethylpentene resin together with other resin such as a polyketone or a polycarbonate.

Thus, an object of the present invention is to provide an adhesive composition which can favorably bond a polymethylpentene resin together with a polar resin such as an ethylene-vinyl alcohol copolymer resin or a polyamide resin, or together with a polyolefin resin such as a polypropylene resin, and which can maintain good adhesion between the resins even after stretching or other treatment is performed. Another object of the present invention is to provide a laminate which includes a polymethylpentene resin layer and a polar resin layer such as an ethylene-vinyl alcohol copolymer resin layer or a polyamide resin layer, or a polyolefin resin layer such as a polypropylene resin layer, and which maintains good adhesion between the layers even after being subjected to stretching or other treatment.

Further objects of the present invention are to provide a bonding material capable of favorably bonding a polymethylpentene resin together with other resin such as a polyketone or a polycarbonate, and to provide a laminate which includes a polymethylpentene resin layer and a resin layer such as of a polyketone or a polycarbonate and which has good adhesion between these layers.

Solution to Problem

The present invention pertains to, for example, the following aspects [1] to [21].

[1] An adhesive resin composition including:
a propylene polymer (A),
an ethylene polymer (B), and
a thermoplastic resin (C) including a copolymer containing not less than 60 mol % and not more than 99 mol % of structural units derived from 4-methyl-1-pentene, and not less than 1 mol % and not more than 40 mol % of structural units derived from a C2-C20 α-olefin other than 4-methyl-1-pentene, the structural units derived from 4-methyl-1-pentene and the structural units derived from a C2-C20 α-olefin other than 4-methyl-1-pentene representing in total 100 mol % of the copolymer, the thermoplastic resin (C) showing a melting point Tm of not more than 199° C. or showing substantially no melting point as analyzed with a differential scanning calorimeter (DSC),
the total of the components (A), (B) and (C) taken as 100 parts by mass including 45 to 75 parts by mass of the component (A), 5 to 20 parts by mass of the component (B), and 15 to 45 parts by mass of the component (C).

[2] The adhesive resin composition described in [1], wherein the propylene polymer (A) contains 75 to 100 mol % of structural units derived from propylene.

[3] The adhesive resin composition described in [1] or [2], wherein part or all of the propylene polymer (A), the ethylene polymer (B), and the copolymer included in the thermoplastic resin (C) are graft-modified with an unsaturated carboxylic acid and/or a derivative thereof.

[4] A laminate including:
a thermoplastic resin layer (X),
a thermoplastic resin layer (Y) including a polymer containing, with respect to all structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC), and
an adhesive layer disposed between the thermoplastic resin layer (X) and the thermoplastic resin layer (Y) and including the adhesive resin composition described in any of [1] to [3].

[5] The laminate described in [4], wherein the layer (X) is a layer including a polypropylene.

[6] The laminate described in [4], wherein the layer (X) is a layer including a resin containing an OH group or an NH group.

[7] The laminate described in [4], wherein the layer (X) is a layer including an ethylene-vinyl alcohol copolymer.

[8] The laminate described in [4], wherein the layer (X) is a layer including a resin containing a polyamide.

[9] The laminate described in any of [4] to [8], which is formed by a coextrusion cast film forming method.

[10] The laminate described in any of [4] to [8], which is formed by a blown-film coextrusion method.

[11] A food packaging container or food packaging bag produced using the laminate described in any of [4] to [10].

[12] The adhesive resin composition described in [1] or [2], wherein the composition further includes a carbodiimide-modified polyolefin (D), and the total of the components (A), (B), (C) and (D) taken as 100 parts by mass includes 10 to 65 parts by mass of the component (A), 5 to 20 parts by mass of the component (B), 15 to 45 parts by mass of the component (C), and 5 to 30 parts by mass of the component (D).

[13] The adhesive resin composition described in [12], which includes carbodiimide groups in an amount of 0.1 to 50 mmol per 100 g.

[14] A laminate including:
a layer (E) including a resin having no active hydrogen in a main molecular skeleton,
a thermoplastic resin layer (Y) including a polymer containing, with respect to all structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC), and
an adhesive layer disposed between the layer (E) and the thermoplastic resin layer (Y) and including the adhesive resin composition described in [12] or [13].

[15] The laminate described in [14], wherein the resin having no active hydrogen in the main molecular skeleton is a polyketone.

[16] The laminate described in [15], wherein the polyketone is a linear polymer in which carbonyl groups, and divalent organic groups derived from an ethylenically unsaturated compound or divalent organic groups formed by linking of two or more of the organic groups are bonded alternately.

[17] The laminate described in [15] or [16], wherein the polyketone is an ethylene-carbon monoxide copolymer or an ethylene-propylene-carbon monoxide copolymer.

[18] The laminate described in [14], wherein the resin having no active hydrogen in the main molecular skeleton is a polar resin.

[19] The laminate described in [18], wherein the polar resin is a polycarbonate.

[20] A laminate including:
a layer (G) including a resin having active hydrogen in a main molecular skeleton, the layer (G) being free from resins having no active hydrogen in a main molecular skeleton,
a thermoplastic resin layer (Y) including a polymer containing, with respect to all structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC), and
an adhesive layer disposed between the layer (G) and the thermoplastic resin layer (Y) and including the adhesive resin composition described in [12] or [13].

[21] The laminate described in [20], wherein the resin having active hydrogen in the main molecular skeleton is a modified fluororesin.

Advantageous Effects of Invention

The adhesive resin compositions of the present invention can favorably bond a polymethylpentene resin together with a polar resin such as an ethylene-vinyl alcohol copolymer resin or a polyamide resin, or together with a polyolefin resin such as a polypropylene resin, and can maintain good adhesion between the resins even after stretching or other treatment is performed. The laminates of the present invention include, for example, a polymethylpentene resin layer and a polar resin layer such as of an ethylene-vinyl alcohol copolymer resin or a polyamide resin, or a polyolefin resin layer such as a polypropylene resin layer, and have good adhesion between the layers and maintain the good adhesion even after being subjected to stretching or other treatment.

Further, the adhesive resin compositions of the present invention can favorably bond a polymethylpentene resin together with other resin such as a polyketone or a polycarbonate. The laminates of the present invention include, for example, a polymethylpentene resin layer and a resin layer such as of a polyketone or a polycarbonate and have good adhesion between these layers.

DESCRIPTION OF EMBODIMENTS

[Adhesive Resin Compositions]

An adhesive resin composition of the present invention includes:
- a propylene polymer (A),
- an ethylene polymer (B), and
- a thermoplastic resin (C) including a copolymer containing not less than 60 mol % and not more than 99 mol % of structural units derived from 4-methyl-1-pentene, and not less than 1 mol % and not more than 40 mol % of structural units derived from a C2-C20 α-olefin other than 4-methyl-1-pentene. The structural units derived from 4-methyl-1-pentene and the structural units derived from a C2-C20 α-olefin other than 4-methyl-1-pentene represent in total 100 mol % of the copolymer. The thermoplastic resin (C) shows a melting point Tm of not more than 199° C. or shows substantially no melting point as analyzed with a differential scanning calorimeter (DSC).

The adhesive resin composition of the present invention may further include a carbodiimide-modified polyolefin (D).

Propylene Polymers (A)

The propylene polymer (A) may be an isotactic polypropylene or a syndiotactic polypropylene. The propylene polymer (A) may be a homopolypropylene, or a random copolymer or block copolymer of propylene and a C2-C20 α-olefin (except propylene). Specific examples of the α-olefins include ethylene, 1-butene, 1-pentene, 1-hexene, 1-octene, 1-decene and 4-methyl-1-pentene. Two or more of these olefins may be used in combination.

The propylene polymer (A) preferably includes propylene-derived structural units in an amount of 75 to 100 mol %, more preferably 85 to 100 mol %, and still more preferably 90 to 100 mol %.

The propylene polymers (A) may be used singly, or a plurality of the polymers may be used in combination.

The propylene polymer (A) preferably has a density in the range of 0.860 to 0.910 g/cm$^3$, more preferably 0.875 to 0.910 g/cm$^3$, and still more preferably 0.885 to 0.910 g/cm$^3$.

The propylene polymer (A) preferably has a melt flow rate (MFR) in the range of 0.1 to 100 g/10 min, more preferably 0.2 to 50 g/10 min, and still more preferably 0.3 to 30 g/10 min as measured in accordance with ASTM D 1238 at a temperature of 230° C. under a load of 2.16 kg.

Ethylene Polymers (B)

The ethylene polymer (B) is an ethylene homopolymer or a copolymer of ethylene and an α-olefin. Examples of the α-olefins include those α-olefins having 3 or more carbon atoms, preferably 3 to 10 carbon atoms. Specific examples include propylene, 1-butene, 1-pentene, 1-hexene, 1-octene, 1-decene and 4-methyl-1-pentene. Two or more of these olefins may be used in combination. The content of the α-olefin comonomer is usually 10 mol % or less.

The ethylene polymer (B) preferably has a density in the range of 0.855 to 0.970 g/cm$^3$, more preferably 0.860 to 0.940 g/cm$^3$, and still more preferably 0.865 to 0.930 g/cm$^3$.

The ethylene polymer (B) preferably has a melt flow rate (MFR) in the range of 0.1 to 20 g/10 min, more preferably 0.3 to 16 g/10 min, and still more preferably 0.5 to 10 g/10 min as measured in accordance with ASTM D 1238 at a temperature of 190° C. under a load of 2.16 kg.

Thermoplastic Resins (C)

The thermoplastic resin (C) includes a copolymer containing structural units derived from 4-methyl-1-pentene and structural units derived from a C2-C20 α-olefin other than 4-methyl-1-pentene. The structural units derived from 4-methyl-1-pentene and the structural units derived from a C2-C20 α-olefin other than 4-methyl-1-pentene represent in total 100 mol % of the copolymer.

Examples of the C2-C20 α-olefins other than 4-methyl-1-pentene include ethylene, propylene, 1-butene, 1-hexene, 1-octene, 1-decene, 1-tetradecene and 1-octadecene. Among the α-olefins, ethylene, propylene, 1-butene, 1-hexene, 1-octene and 1-decene are preferable. Ethylene, propylene, 1-butene, 1-hexene and 1-octene are more preferable. Ethylene, propylene, 1-butene and 1-hexene are still more preferable. The α-olefins may be used singly, or two or more may be used in combination.

In the copolymer, the content of the structural units derived from 4-methyl-1-pentene is not less than 60 mol % and not more than 99 mol %, preferably not less than 63 mol % and not more than 98 mol %, more preferably not less than 65 mol % and not more than 95 mol %, still more preferably not less than 65 mol % and not more than 90 mol %, and particularly preferably not less than 65 mol % and not more than 87 mol %. The content of the structural units derived from a C2-C20 α-olefin other than 4-methyl-1-pentene is not less than 1 mol % and not more than 40 mol %, preferably not less than 2 mol % and not more than 37 mol %, more preferably not less than 5 mol % and not more than 35 mol %, still more preferably not less than 10 mol % and not more than 35 mol %, and particularly preferably not less than 13 mol % and not more than 35 mol %. The amounts of the structural units in the above ranges ensure that the composition that is obtained will attain excellent heat resistance and bond strength.

The copolymer preferably has a melt flow rate (MFR) in the range of 0.5 to 50/10 min, and more preferably in the range of 0.5 to 30 g/10 min as measured in accordance with ASTM D 1238 at a temperature of 230° C. under a load of 2.16 kg.

The thermoplastic resin (C) preferably has a density in the range of 0.825 to 0.870 g/cm$^3$, more preferably 0.827 to 0.860 g/cm$^3$, and still more preferably 0.830 to 0.850 g/cm$^3$.

The thermoplastic resin (C) shows a melting point Tm of not more than 199° C. or shows substantially no melting point as analyzed with a differential scanning calorimeter (DSC).

Carbodiimide-Modified Polyolefins (D)

The carbodiimide-modified polyolefin (D) is a product from the reaction of a polyolefin (a) having a group capable of reacting with a carbodiimide group, and a carbodiimide group-containing compound (b).

When the adhesive resin composition of the present invention includes the carbodiimide-modified polyolefin (D), the adhesive resin composition of the present invention contains a carbodiimide group.

The carbodiimide-modified polyolefin (D) preferably has 5 or more carbodiimide groups, and more preferably 10 or more carbodiimide groups in the molecule. The upper limit of the number of the carbodiimide groups is usually 30 but is not particularly limited thereto as long as the advantageous effects of the present invention are achieved.

(Polyolefins (a))

The polyolefin (a) having a group capable of reacting with a carbodiimide group may be obtained by introducing, into a polyolefin, a compound (m) having a group capable of reacting with a carbodiimide group. The polyolefins (a) may be used singly, or two or more may be used in combination.

Examples of the compounds (m) include those compounds which have an active hydrogen-containing group reactive with a carbodiimide group. Specific examples include compounds having a group derived from, for example, a carboxylic acid, an amine, an alcohol or a thiol. In particular, compounds having a group derived from a carboxylic acid are suitably used, and among such compounds, unsaturated carboxylic acids and/or derivatives thereof are particularly preferable. Besides the compounds which have an active hydrogen-containing group, use may be preferably made of compounds which have a group readily converted into an active hydrogen-containing group by the action of water or the like. Specific examples thereof include compounds having an epoxy group and compounds having a glycidyl group. The compounds (m) may be used singly, or two or more may be used in combination.

Examples of the unsaturated carboxylic acids and/or the derivatives thereof used as the compounds (m) include unsaturated compounds having one or more carboxylic acid groups, and derivatives of such compounds, with unsaturated compounds having one or more carboxylic anhydride groups, and derivatives thereof being preferable. Examples of the unsaturated groups include vinyl groups, vinylene groups and unsaturated cyclic hydrocarbon groups. Specific examples of such compounds include unsaturated carboxylic acids such as (meth)acrylic acid, maleic acid, fumaric acid, tetrahydrophthalic acid, itaconic acid, citraconic acid, crotonic acid, isocrotonic acid, norbornenedicarboxylic acid and bicyclo[2.2.1]hept-2-ene-5,6-dicarboxylic acid, anhydrides of these acids, and derivatives of these compounds (such as, for example, acid halides, amides, imides and esters). Specific examples of the acid anhydrides and the derivatives include maleic anhydride, itaconic anhydride, citraconic anhydride, tetrahydrophthalic anhydride, bicyclo[2.2.1]hept-2-ene-5,6-dicarboxylic anhydride; malenyl chloride; malenylimide; dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-ene-5,6-dicarboxylate, hydroxyethyl (meth)acrylate, hydroxypropyl (meth)acrylate, glycidyl (meth)acrylate, aminoethyl (meth)acrylate and aminopropyl (meth)acrylate.

A single, or two or more of the unsaturated carboxylic acids and/or the derivatives thereof may be used as the compounds (m). In particular, maleic anhydride, itaconic anhydride, citraconic anhydride, tetrahydrophthalic anhydride, bicyclo[2.2.1]hept-2-ene-5,6-dicarboxylic anhydride, (meth)acrylic acid, hydroxyethyl (meth)acrylate, glycidyl methacrylate and aminopropyl methacrylate are preferable. Further, dicarboxylic anhydrides such as maleic anhydride, itaconic anhydride, citraconic anhydride, tetrahydrophthalic anhydride and bicyclo[2.2.1]hept-2-ene-5,6-dicarboxylic anhydride are particularly preferable.

The compound (m) may be introduced into a polyolefin by a known method. For example, the compound (m) may be graft-copolymerized to a polyolefin main chain, or the compound (m) and an olefin may be radically copolymerized. The introduction will be described in detail below based on graft copolymerization and radical copolymerization.

<Graft Copolymerization>

The polyolefin (a) having a group capable of reacting with a carbodiimide group may be obtained by graft copolymerizing a compound (m) having a group capable of reacting with a carbodiimide group, and optionally other components such as an ethylenically unsaturated monomer onto a polyolefin main chain in the presence of a radical initiator.

<<Polyolefin Main Chains>>

The polyolefin used as the polyolefin main chain is a polymer principally including a C2-C20 aliphatic α-olefin, a cyclic olefin and/or a nonconjugated diene, and is preferably a polymer principally including a C2-C10 aliphatic α-olefin, more preferably a C2-C8 aliphatic α-olefin. These olefins may be used singly, or two or more may be used in combination. In the case of a copolymer, the content of the olefin comonomer(s) is not particularly limited as long as the advantageous effects of the present invention are achieved, but is usually not more than 50 mol %, preferably not more than 40 mol %, and more preferably not more than 30 mol %. Among such polyolefins as described above, crystalline polyolefins such as polyethylene, polypropylene, poly-butene-1, poly-4-methyl-1-pentene, and α-olefin copolymers of ethylene, propylene, butene-1 or 4-methyl-1-pentene with a comonomer are preferable, and polyethylene, polypropylene and propylene-ethylene copolymer are more preferable. The stereoregularity is not particularly limited, and the structure may be isotactic or syndiotactic.

The density (measured in accordance with JIS K7112) of the polyolefin used for the graft modification is not particularly limited as long as the advantageous effects of the present invention are achieved, but is usually 0.8 to 1.1 g/cm$^3$, preferably 0.8 to 1.05 g/cm$^3$, and more preferably 0.8 to 1.0 g/cm$^3$. The melt flow rate (MFR) measured in accordance with ASTM D1238 at 230° C. under 2.16 kg load is not particularly limited as long as the advantageous effects of the present invention are achieved, but is usually 0.01 to 500 g/10 min, preferably 0.05 to 200 g/10 min, and more preferably 0.1 to 100 g/10 min. When the density and the MFR are in the above ranges, the graft copolymer resulting from the modification has a similar density and a similar MFR and is easy to handle.

The degree of crystallinity of the polyolefin used for the graft modification is not particularly limited as long as the advantageous effects of the present invention are achieved, but is usually not less than 2%, preferably not less than 5%, and more preferably not less than 10%. When the degree of crystallinity is in this range, the graft copolymer resulting from the modification exhibits excellent handleability.

In the polyolefin used for the graft modification, the number average molecular weight (Mn) measured by gel permeation chromatography (GPC) is preferably 5,000 to 500,000, and more preferably 10,000 to 100,000. When the number average molecular weight (Mn) is in this range, excellent handleability is obtained. For an ethylenic polyolefin, the number average molecular weight may be determined as polyethylene equivalent when the amount of comonomer is not more than 10 mol %, and may be measured as ethylene-propylene equivalent (70 mol % ethylene) when the amount of comonomer is not less than 10 mol %.

The polyolefin used for the graft modification may be produced by any conventionally known method. For example, an olefin may be polymerized using a titanium catalyst, a vanadium catalyst, a metallocene catalyst or the like. Further, the polyolefin used for the graft modification may be in the form of a resin or an elastomer, and the stereoregularity is not particularly limited and may be isotactic or syndiotactic. It is also possible to use a commercially available resin as it is.

<<Graft Polymerization Methods>>

The compound (m) may be grafted to the polyolefin main chain by any method without limitation. A conventionally known graft polymerization method such as a solution method or a melt-kneading method may be adopted.

The amount of the grafts of the compound (m) is usually 0.05 to 20 wt %, preferably 0.05 to 10 wt %, more preferably 0.05 to 5 wt %, and still more preferably 0.05 to 3 wt % relative to the polyolefin (a) taken as 100 wt %. The amount of the grafts of the compound (m) is the net amount of grafting measured after the free compound (m) is removed from the polyolefin (a). The amount of the grafts may be measured by a known process such as $^{13}$C-NMR or $^{1}$H-NMR. When the compound (m) that is used is a monomer having an acidic functional group such as an unsaturated carboxylic acid or an acid anhydride thereof, for example, the acid value may be used as an index of the amount of the functional groups introduced into the polyolefin (a). When maleic anhydride is used as the compound (m), the amount of grafting may be determined based on the absorption spectrum of the carbonyl groups in maleic anhydride that is usually detected at near 1780 to 1790 cm$^{-1}$ using an infrared spectrophotometer.

<Radical Copolymerization>

The polyolefin (a) having a group capable of reacting with a carbodiimide group may also be obtained by radically copolymerizing an olefin and a compound (m) having a group capable of reacting with a carbodiimide group. The olefin used herein may be the same as the olefin for forming a polyolefin used as the polyolefin main chain. The olefin and the compound (m) may be copolymerized by any conventionally known radical copolymerization method without limitation.

(Configurations of Polyolefins (a))

In the polyolefin (a) having a group capable of reacting with a carbodiimide group, the amount of structural units derived from the compound (m) having a group capable of reacting with a carbodiimide group (for example: the structural unit content or the amount of grafting) is usually 0.05 to 20 wt %, preferably 0.05 to 5 wt %, and more preferably 0.05 to 3 wt %. When the amount of structural units derived from the compound (m) having a group capable of reacting with a carbodiimide group is in the above range, the polyolefin (a) and the carbodiimide group-containing compound (b) are advantageously favorably crosslinked to give a bonding material. If the amount falls below the above range, the bond strength may be insufficient.

The density (measured in accordance with JIS K7112) of the polyolefin (a) having a group capable of reacting with a carbodiimide group is usually 0.870 to 0.940 g/cm$^3$, preferably 0.875 to 0.940 g/cm$^3$, and more preferably 0.880 to 0.940 g/cm$^3$.

(Carbodiimide Group-Containing Compounds (b))

For example, the carbodiimide group-containing compound (b) is a polycarbodiimide having a repeating unit represented by the general formula (2). The carbodiimide group-containing compounds (b) may be used singly, or two or more may be used in combination.

[Chem. 1]

(2)

In the formula (2), R$_1$ represents a C2-C40 divalent organic group.

The polycarbodiimide may be produced by subjecting an organic diisocyanate such as an aliphatic diisocyanate, an aromatic diisocyanate or an alicyclic diisocyanate to decarboxylative condensation reaction in the presence of a condensation catalyst without a solvent or in an inert solvent. For example, among others, a single or a mixture of diisocyanates may be used such as hexamethylene diisocyanate, 4,4-diphenylmethane diisocyanate, 1,4-phenylene diisocyanate, 2,4-tolylene diisocyanate, xylylene diisocyanate, cyclohexane-1,4-diisocyanate, dicyclohexylmethane-4,4'-diisocyanate and isophorone diisocyanate. In the decarboxylative condensation reaction, the polymerization degree of the polycarbodiimide may be controlled by selecting conditions such as the type of the catalyst, the reaction temperature, and the type of an endcapping agent. The polymerization degree is usually 2 to 40, and preferably 4 to 20. Examples of the endcapping agents which may be used include monoisocyanates such as phenyl isocyanate, tolyl isocyanate and naphthyl isocyanate, and active hydrogen-containing compounds such as methanol, ethanol, diethylamine, cyclohexylamine, succinic acid, benzoic acid and ethyl mercaptan. Examples of the condensation catalysts which may be used include alcoholates such as those of titanium, hafnium, zirconium, sodium and calcium, and organophosphorus compounds such as phosphorene oxide.

The polystyrene-equivalent number average molecular weight (Mn) of the carbodiimide group-containing compound (b) according to gel permeation chromatography (GPC) is not particularly limited as long as the advantageous effects of the present invention are achieved, but is usually 400 to 500,000, preferably 700 to 10,000, more preferably 1,000 to 8,000, and still more preferably 1,000 to 4,000. When the number average molecular weight (Mn) is in this range, the bonding material advantageously attains excellent bond strength.

The carbodiimide group-containing compound (b) may be a polycarbodiimide including a monocarbodiimide component. A single compound, or a mixture of compounds may be used.

In the present invention, a commercially available carbodiimide group-containing compound may be used as it is. Examples of the commercially available carbodiimide group-containing compounds include CARBODILITE (registered trademark) series HMV-8CA and HMV-15CA, and CARBODILITE (registered trademark) LA1 manufactured by Nisshinbo Chemical Inc.

In the present invention, an increasing number of carbodiimide groups in the molecule of the carbodiimide group-containing compound (b) offers more sites for the reaction with polar resins and other resins such as polyketones, and thus a layer formed of the bonding material of the present invention can adhere more firmly to a layer including a polar resin or a layer including other resin such as a polyketone. From this viewpoint, it is preferable to use a carbodiimide group-containing compound (b) having 5 or more carbodiimide groups in the molecule, and it is more preferable to use a carbodiimide group-containing compound (b) having 10 or more carbodiimide groups in the molecule. The upper limit of the number of carbodiimide groups in the molecule is not particularly limited as long as the advantageous effects of the present invention are achieved, but is preferably 30 in view of the fact that the carbodiimide group-containing compound (b) tends to mediate the formation of a cross-linked structure and may deteriorate formability with increasing number of carbodiimide groups in the molecule.

The content of the carbodiimide groups in the carbodiimide group-containing compound (b) may be measured by a technique such as 13C-NMR, IR or titration, and may be grasped as the carbodiimide group equivalent. A peak will appear at 130 to 142 ppm in 13C-NMR, or at 2130 to 2140 cm$^{-1}$ in IR.

For example, the $^{13}$C-NMR measurement is performed as follows. Specifically, 0.35 g of a sample is dissolved by heating into 2.0 ml of hexachlorobutadiene. The resultant solution is filtered through a glass filter (G2), and thereafter 0.5 ml of deuterated benzene is added. The mixture is charged into an NMR tube having an inner diameter of 10 mm and is analyzed by $^{13}$C-NMR at 120° C. using NMR measurement device GX-500 manufactured by JEOL Ltd. The number of scans is at least 10,000.

(Methods for Preparing Polyolefins)

The carbodiimide-modified polyolefin (D) is obtained by reacting the polyolefin (a) having a group capable of reacting with a carbodiimide group, and the carbodiimide group-containing compound (b) preferably at 230° C. or above. Specifically, a bonding material including the polyolefin may be obtained by, although not limited to, a melt-kneading process such as melt modification.

An exemplary melt-kneading process is described below. The reaction process is not particularly limited but may be such that the polyolefin (a) and the carbodiimide group-containing compound (b) are charged into, for example, a Henschel mixer, a twin-cylinder blender, a tumbler blender, a ribbon blender or the like and are kneaded therein, and the kneaded mixture is melt-kneaded with a single-screw extruder, a multi-screw extruder, a kneader, a Banbury mixer or the like. Among these devices, one having an excellent kneading performance such as a multi-screw extruder, a kneader or a Banbury mixer is preferably used because the components may be reacted and dispersed more uniformly to give a satisfactory bonding material.

The polyolefin (a) and the carbodiimide group-containing compound (b) may be mixed together beforehand and then supplied from a hopper. Alternatively, part of the components may be supplied from a hopper and the rest of the components may be supplied through a feed port disposed at an appropriate position between the vicinity of the hopper and the tip of the extruder.

When the components described above are melt-kneaded, the reaction may be performed at a temperature that is equal to or higher than the highest melting point of the melting points of the components that are mixed. Specifically, the melt-kneading temperature is usually in the range of 180 to 320° C., preferably 230 to 300° C., and more preferably 235 to 280° C.

Compositions

In the adhesive resin composition of the present invention, part or all of the propylene polymer (A), the ethylene polymer (B) and the copolymer included in the thermoplastic resin (C) may be graft-modified with an unsaturated carboxylic acid and/or a derivative thereof. That is, any one or two of the component (A), the component (B) and the component (C) may be graft-modified, or all the three components may be graft-modified. Further, each of the component (A), the component (B) and the component (C) may be partially graft-modified or wholly graft-modified.

The graft modification may be generally performed by grafting an unsaturated carboxylic acid and/or a derivative thereof onto the base polymer. Examples of the unsaturated carboxylic acids include maleic acid, fumaric acid, tetrahydrophthalic acid, itaconic acid, citraconic acid, crotonic acid, isocrotonic acid, nadic acid (the registered trademark of endocis-bicyclo[2,2,1]hept-5-ene-2,3-dicarboxylic acid), acrylic acid and methacrylic acid. Examples of the derivatives of the unsaturated carboxylic acids include acid anhydrides, imides, amides and esters of the above unsaturated carboxylic acids, with specific examples including maleimide, maleic anhydride, citraconic anhydride, monomethyl maleate and glycidyl maleate. Among these, unsaturated carboxylic acids and acid anhydrides thereof are preferable, and maleic acid, nadic acid and acid anhydrides thereof are particularly preferable. The unsaturated carboxylic acids and/or the derivatives thereof may be used singly, or two or more may be used in combination.

The grafting reaction may be performed using a conventionally known process. When, for example, the propylene polymer is used as the base polymer, the process may be such that, for example, the propylene polymer is dissolved into an organic solvent, then an unsaturated carboxylic acid or a derivative thereof and, if necessary, a radical initiator such as an organic peroxide are added to the solution obtained, and the reaction is performed usually at a temperature of 60 to 350° C., preferably 80 to 190° C., for 0.5 to 15 hours, preferably 1 to 10 hours. Alternatively, a process may be adopted in which the propylene polymer, an unsaturated carboxylic acid or a derivative thereof and, if necessary, a radical initiator such as an organic peroxide are added to an extruder or the like and are reacted in the absence of a solvent usually at a temperature not less than the melting point of the propylene polymer, preferably 120 to 350° C., for 0.5 to 10 minutes.

Preferred radical initiators are organic peroxides such as dicumyl peroxide, di-tert-butyl peroxide, 2,5-dimethyl-2,5-di(tert-butylperoxy)hexyne-3,2,5-dimethyl-2,5-di(tert-butylperoxy)hexane and 1,4-bis(tert-butylperoxyisopropyl)benzene.

The amount of graft modification in terms of the weight of the graft monomer is preferably 0.01 to 10 mass %, more preferably 0.1 to 5 mass %, and still more preferably 1 to 5 mass %. When the amount of graft modification is in the above range, good interlayer adhesion is obtained in a laminate.

In the adhesive resin composition of the present invention, the total of the components (A), (B) and (C) taken as 100 parts by mass includes 45 to 75 parts by mass of the component (A), 5 to 20 parts by mass of the component (B) and 15 to 45 parts by mass of the component (C), preferably includes 47 to 72 parts by mass of the component (A), 7 to 20 parts by mass of the component (B) and 17 to 42 parts by mass of the component (C), and more preferably includes 50 to 70 parts by mass of the component (A), 10 to 20 parts by mass of the component (B) and 20 to 40 parts by mass of the component (C).

When the adhesive resin composition of the present invention contains the component (D), the total of the components (A), (B), (C) and (D) taken as 100 parts by mass includes 10 to 65 parts by mass of the component (A), 5 to 20 parts by mass of the component (B), 15 to 45 parts by mass of the component (C) and 5 to 30 parts by mass of the component (D), preferably includes 20 to 65 parts by mass of the component (A), 5 to 17 parts by mass of the component (B), 17 to 42 parts by mass of the component (C) and 10 to 30 parts by mass of the component (D), and more preferably includes 20 to 60 parts by mass of the component (A), 7 to 17 parts by mass of the component (B), 20 to 40 parts by mass of the component (C) and 10 to 25 parts by mass of the component (D).

In the adhesive resin composition of the present invention, the melt flow rate (MFR) measured in accordance with ASTM D 1238 at a temperature of 230° C. under a load of 2.16 kg is preferably in the range of 0.3 to 20 g/10 min, and more preferably in the range of 0.5 to 15 g/10 min.

The density of the adhesive resin composition of the present invention measured in accordance with JIS K7112 is preferably in the range of 0.860 to 0.900 g/cm$^3$, and more preferably 0.865 to 0.890 g/cm$^3$.

The content of carbodiimide groups in the bonding material is preferably 0.1 to 50 mmol per 100 g of the bonding material, and is more preferably 0.2 to 40 mmol, and still more preferably 0.5 to 30 mmol. This range of the content of carbodiimide groups in the bonding material advantageously ensures that excellent adhesion will be obtained and the crosslinking of the polyolefin (a) through the carbodiimide group-containing compound (b) will be reduced.

The content of carbodiimide groups in the bonding material may be calculated from the amount of the carbodiimide group-containing compound (b) that is charged, or may be determined by a technique such as $^{13}$C-NMR, IR or titration and may be grasped as the carbodiimide group equivalent. A peak will appear at 130 to 142 ppm in $^{13}$C-NMR, or at 2130 to 2140 cm$^{-1}$ in IR. The $^{13}$C-NMR measurement is performed by, for example, the method described hereinabove for measuring the content of carbodiimide groups in the carbodiimide group-containing compound (b).

As already mentioned, the carbodiimide-modified polyolefin (D) is produced by the reaction of the carbodiimide groups (NCN) in the carbodiimide group-containing compound (b) with the groups in the polyolefin (a) that are capable of reacting with a carbodiimide group. A certain proportion of the carbodiimide groups is consumed during this process of reaction. The carbodiimide group residues that are bonded to form molecular chains with the polyolefin groups contribute to adhesion with other resins such as polyketones and polar resins. If the content of carbodiimide groups in the bonding material exceeds the range described hereinabove, excess free carbodiimide groups will be present in the bonding material over the carbodiimide-modified polyolefin (D), thus causing poor bonding performance and low forming processability.

The reaction ratio between the polyolefin (a) and the carbodiimide group-containing compound (b) may be evaluated by the following method.

The polyolefin (a) (as a reference) having a group capable of reacting with a carbodiimide group, and the bonding material of the present invention are each formed into a hot pressed sheet, which is then analyzed with an infrared absorption analyzer to measure the infrared absorption. From the charts thus obtained, the absorbance assigned to the groups capable of reacting with a carbodiimide group that are present in the polyolefin (a) is compared with the difference between the absorbance assigned to the groups capable of reacting with a carbodiimide group that are present in the polyolefin (a) and the absorbance assigned to the groups capable of reacting with a carbodiimide group that are present in the bonding material. The reaction ratio may be calculated using the equation (α1) below. When the group capable of reacting with a carbodiimide group is a group derived from maleic anhydride, an absorbance at near 1790 cm$^{-1}$ may be used.

$$\text{Reaction ratio (\%)} = \{P/Q\} \times 100 \qquad \text{Eq. (α1)}$$

P: Difference between the absorbance assigned to the groups capable of reacting with a carbodiimide group that are present in the polyolefin (a) and the absorbance assigned to the groups capable of reacting with a carbodiimide group that are present in the bonding material.

Q: Absorbance assigned to the groups capable of reacting with a carbodiimide group that are present in the polyolefin (a).

The reaction ratio determined by the above method with respect to the bonding material is usually in the range of 40 to 100%, preferably 60 to 100%, and more preferably 80 to 100%.

The carbodiimide groups convert to urea groups upon water absorption. Even the urea groups exhibit high reactivity with resins such as polyketones and polar resins. Thus, the bonding material may include a polyolefin which has a urea group converted from a carbodiimide group by the action of, for example, water in the atmosphere. Such a bonding material also constitutes one of the preferred embodiments of the present invention.

The adhesive resin composition of the present invention may be prepared by various known methods, for example, by a method in which the components described hereinabove are dry blended with a Henschel mixer, a tumbler blender, a twin-cylinder blender or the like, a method in which the dry blend described above is melt-kneaded with a single-screw extruder, a multi-screw extruder, a Banbury mixer or the like, or a method in which the components are mixed together by stirring in the presence of a solvent.

Where necessary, the adhesive resin composition of the present invention may contain additional components which are commonly used, for example, additives such as oxidation inhibitors, weather stabilizers, antistatic agents, antifogging agents, antiblocking agents, lubricants, nucleating agents and pigments, other polymers and rubbers, as long as the objects of the present invention are still achieved.

[Laminates]

By stacking layers such as resin layers through the use of the adhesive resin composition, a laminate may be obtained which includes an adhesive layer formed of the adhesive resin composition. The number of layers present in the laminate is not particularly limited and may be two, three, four, five or more.

For example, two thermoplastic resin layers may be stacked using the adhesive resin composition to form a laminate which has at least three layers including a layered structure represented by thermoplastic resin layer/adhesive layer/thermoplastic resin layer.

For example, such a laminate having at least three layers may be one which includes a thermoplastic resin layer (X); a thermoplastic resin layer (Y) including a polymer containing, with respect to all the structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC); and an adhesive layer disposed between the thermoplastic resin layer (X) and the thermoplastic resin layer (Y) and including the adhesive resin composition described hereinabove. In this laminate, the thermoplastic resin layer (X) and the thermoplastic resin layer (Y) are bonded to each other with high bond strength by the adhesive layer including the adhesive resin composition.

The thermoplastic resin layer (X) is not particularly limited as long as the layer includes a thermoplastic resin and differs from the thermoplastic resin layer (Y). The thermoplastic resin layer (X) may include a polypropylene. The polypropylene may be a homopolypropylene, or a random copolymer or block copolymer of propylene with a C2-C20 α-olefin (except propylene). Specifically, for example, the α-olefin may be ethylene, 1-butene, 1-pentene, 1-hexene, 1-octene, 1-decene, 4-methyl-1-pentene, or a combination of two or more of these α-olefins.

To impart gas barrier properties, the thermoplastic resin layer (X) preferably includes a resin having a polar group. The thermoplastic resin layer (X) may include both a polypropylene and a resin having a polar group.

The resin having a polar group is not particularly limited, but is suitably a resin which contains an OH group or an NH group in a repeating unit. Examples of the groups containing an OH group include hydroxyl group. Examples of the groups containing an NH group include amide group, amine group, urethane group and urea group.

Examples of the resins containing a hydroxyl group include polyvinyl alcohols, ethylene-vinyl alcohol copolymers (EVOH), hydroxyl group-containing 1-olefin homopolymers or copolymers, poly(hydroxystyrenes) and poly(hydroxyalkyl vinyl ethers). Among these, ethylene-vinyl alcohol copolymers are particularly preferable.

The ethylene-vinyl alcohol copolymer may be, for example, a saponified copolymer obtained by saponifying an ethylene-vinyl acetate copolymer having an ethylene content of 20 to 60 mol %, especially 24 to 50 mol %, to a saponification degree of 96 mol % or more, especially 99 mol % or more. This saponified ethylene-vinyl alcohol copolymer preferably has a molecular weight enough to form a film, and generally the MFR measured at 190° C. under 2.16 kg load is preferably 0.1 to 50 g/10 min, especially 0.5 to 20 g/10 min.

Examples of the resins containing an amide group include polyamides (nylons) and polyacrylamides. Examples of the resins containing an amine group include polyacrylamines. Examples of the resins containing a urethane group include polyurethanes. Examples of the resins containing a urea group include polyureas. Among the resins containing an NH group, polyamides are particularly preferable.

Among the polyamides, specifically, some preferred polyamides are nylon 6, nylon 66, nylon 610, nylon 11, nylon 612, nylon 12, nylon 46, nylon MXD6, polyhexamethylene terephthalamide, polyhexamethylene (terephthalamide-isophthalamide) (copolymer), polyhexamethylene (terephthalamide-adipamide) (copolymer), polymetaphenylene isophthalamide (meta aramid) and polyparaphenylene terephthalamide (para aramid). In particular, aliphatic polyamides such as nylon 6, nylon 66, nylon 610, nylon 11, nylon 612 and nylon 12 are preferable.

These polyamides too preferably have a molecular weight enough to form a film, and the intrinsic relative viscosity [η] measured at a temperature of 30° C. in concentrated sulfuric acid is desirably not less than 0.5 dl/g, preferably not less than 0.8 dl/g, and particularly preferably not less than 1.0 dl/g.

The thermoplastic resin layer (Y) includes structural units derived from 4-methyl-1-pentene in an amount of, with respect to all the structural units, 90 mol % or more and 100 mol % or less, preferably 92 mol % or more and 100 mol % or less, and more preferably 95 mol % or more and 100 mol % or less.

The thermoplastic resin layer (Y) includes structural units derived from a C2-C20 α-olefin other than 4-methyl-1-pentene in an amount of, with respect to all the structural units, 0 mol % or more and 10 mol % or less, preferably 0 mol % or more and 8 mol % or less, and more preferably 0 mol % or more and 5 mol % or less. Examples of the C2-C20 α-olefins other than 4-methyl-1-pentene include ethylene, propylene, 1-butene, 1-hexene, 1-octene, 1-decene, 1-tetradecene and 1-octadecene.

The thermoplastic resin layer (Y) has a melting point Tm measured with a differential scanning calorimeter (DSC) of not less than 200° C., preferably 210 to 240° C., and more preferably 220 to 235° C.

The adhesive resin composition of the present invention can favorably bond a polymethylpentene resin together with a polar resin such as an ethylene-vinyl alcohol copolymer resin or a polyamide resin, or together with a polyolefin resin such as a polypropylene resin, and can maintain good adhesion between the resins even after stretching or other treatment is performed. Thus, the laminate which includes the thermoplastic resin layer (X), the thermoplastic resin layer (Y), and the adhesive layer including the adhesive resin composition has good adhesion between the thermoplastic resin layer (X) and the thermoplastic resin layer (Y) and maintains good adhesion between the layers even after being subjected to stretching or other treatment.

For example, a laminate which has at least three layers including a layered structure represented by resin layer/adhesive layer/resin layer may be obtained by staking two resin layers through a bonding material including the adhesive resin composition containing the component (D).

For example, such a laminate including a layered structure represented by resin layer/adhesive layer/resin layer may be one which includes a layer (E) including a resin having no active hydrogen in the main molecular skeleton; a thermoplastic resin layer (Y) including a polymer containing, with respect to all the structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC); and an adhesive layer disposed between the layer (E) and the thermoplastic resin layer (Y) and including the bonding material described hereinabove.

The layer (E) includes a resin having no active hydrogen in the main molecular skeleton. The main molecular skeleton of the resin refers to a molecular segment excluding the molecular ends. Examples of the resins having no active hydrogen in the main molecular skeleton include polyketones and polar resins other than polyketones.

Examples of the polyketones include linear polymers in which carbonyl groups (CO), and divalent organic groups derived from an ethylenically unsaturated compound or divalent organic groups formed by linking of two or more of the organic groups are bonded alternately. Such polyketones are usually represented by the general formula (1).

[Chem. 2]

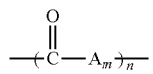
(1)

In the formula (1), A is a divalent organic group derived from an ethylenically unsaturated compound, m is 1 to 6, and n is an integer of 2 or greater, preferably an integer of 2 to 6000. Such polyketones are known and are usually polymers obtained by polymerizing carbon monoxide and an ethylenically unsaturated compound.

Examples of the ethylenically unsaturated compounds include C2-C12 α-olefins such as ethylene, propylene, 1-butene, isobutylene and 1-pentene, with C2-$C_6$ linear α-olefins being preferable, and ethylene alone, or ethylene and propylene being more preferable; dienes such as butadiene, isoprene and 2-chlorobutadiene-1,3, and halides thereof; vinylidenes such as vinylidene chloride, and halides thereof; vinyl esters such as vinyl acetate, vinyl chloroacetate, vinyl dimethylacetate and vinyl trimethylacetate, and halides thereof; vinyl halides such as tetrafluoroethylene and chloroethylene; vinyl acetals such as ketenemethyl (vinyl) acetal; vinyl ketones such as vinyl methyl ketone and vinyl ethyl ketone; styrenes such as styrene, chlorostyrene and α-methylstyrene, and derivatives thereof; acrylic acid and methacrylic acid, and esters, amides, nitriles and acid halides thereof; and vinyl esters of unsaturated carboxylic acids such as vinyl hexenoate and vinyl crotonate.

Among these ethylenically unsaturated compounds, linear C2-C6 α-olefins are preferable. In particular, the polymer preferably includes ethylene alone, or ethylene and propylene. That is, the polyketone is preferably an ethylene-carbon monoxide copolymer or an ethylene-propylene-carbon monoxide copolymer.

The ethylenically unsaturated compounds may be used singly, or two or more may be used in combination. In the latter case, it is preferable to use ethylene in combination with a linear C3-C6 α-olefin, especially propylene. In this case, the ethylene/linear C3-C6 α-olefin molar ratio is preferably greater than 1, and more preferably 2 to 30.

The polyketone usually has a melting point of 175 to 300° C., preferably 210 to 270° C., and an intrinsic viscosity (IV) measured with a standard capillary viscometer in m-cresol of 0.5 to 10 dl/g, preferably 0.8 to 4 dl/g.

The polyketones are known. For example, U.S. Pat. No. 4,880,903 describes linear alternate polyketone terpolymers including carbon monoxide, ethylene and other ethylenically unsaturated compound (for example, propylene). The polyketone may be produced by polymerizing carbon monoxide and the above-described ethylenically unsaturated compound according to a known method. Details of the production methods are described in, for example, JP-A-S47-32100, JP-B-H05-87527 and JP-B-H06-13608.

Commercially available polyketones may be used, with examples including product name AKROTEK: PK-HM manufactured by AKRO-PLASTIC GMBH and product name Carilon manufactured by Shell.

The polyketones may be used singly, or two or more may be used in combination.

In the layer (E), the content of the polyketone is preferably not less than 50 mass %, more preferably not less than 70 mass %, and still more preferably not less than 80 mass %.

The polar resins are preferably polymers which have active hydrogen reactive with the carbodiimide groups present in the bonding material, and are, for example, polymers having a group derived from a carboxylic acid, an amine, an alcohol, a thiol or the like. Specific examples include polyolefins having active hydrogen such as polyesters, polycarbonates, polyphenylene sulfides (PPS), and polyethers including polyphenylene oxides, polyether sulfones (PES) and polyacetals. Incidentally, such resins as polyesters, polycarbonates, PPS, polyphenylene oxides, polyether sulfones and polyacetals have no active hydrogen except at the molecular ends, and constitute examples of the polar resins having no active hydrogen in the main molecular skeleton. The polar resins may be used singly, or two or more may be used in combination.

Examples of the polyesters include aromatic polyesters including amorphous polyesters such as polyethylene terephthalate (PET), recycling waste PET, glycol-modified PET, acid-modified PET, polyethylene naphthalate, polytrimethylene terephthalate and polybutylene terephthalate, and biodegradable polyesters such as polybutylene terephthalate adipate and polyethylene terephthalate succinate; lactic acid resins such as polycaprolactone, polyhydroxybutyrate, polyglycolic acid and polylactic acid; and other biodegradable polyesters. Examples further include liquid crystal polyesters composed of wholly aromatic or semi-aromatic polyesters, and polyarylates. Among these, polyethylene terephthalate, polybutylene terephthalate, polylactic acid and liquid crystal polyesters are preferable.

Examples of the polycarbonates include aromatic bisphenol polycarbonates such as bisphenol A polycarbonate and bisphenol F polycarbonate; and aliphatic carbonates such as polyethylene carbonate and polytrimethylene carbonate. Examples of commercially available polycarbonates include LEXAN™ 141R manufactured by SABIC.

For example, the polyphenylene sulfides (PPS) are polymers formed by connecting aromatic rings via sulfide bonds. Examples thereof include branched or linear polyphenylene sulfides and copolymers thereof. Specific examples include poly(paraphenylene sulfide) and poly(metaphenylene sulfide). Further, the PPS may be copolymers, for example, copolymers having in the molecule units composed of an aromatic ring and a sulfide bond, and other units such as ether units, sulfone units, biphenyl units, naphthyl units, substituted phenyl sulfide units and trifunctional phenyl sulfide units. Specific examples include polythio-1,4-phenylene. Further, commercially available PPS may be used in the present invention. Examples of commercially available PPS include Fortron (registered trademark) FX4382T1 manufactured by Ticona and TORELINA (registered trademark) A900 manufactured by TORAY INDUSTRIES, INC.

Examples of the polyphenylene oxides include poly-1,4-phenylene oxide and poly-2,6-dimethyl-1,4-phenylene oxide.

The polyether sulfones may be any such resins without limitation which are generally used for shaping and film applications.

Examples of the polyacetals include polyformaldehyde (polyoxymethylene), polyacetaldehyde, polypropionaldehyde and polybutylaldehyde. Among these, polyformaldehyde is particularly preferable.

In the present invention, PPS is preferably used as the polar resin for the reason that the laminate that is obtained attains excellent interlayer bond strength as compared with that obtained with other adhesives such as conventional PPS adhesives (epoxy group-containing adhesives) not only at room temperature but also in a higher temperature atmosphere. It is also preferable to use a polycarbonate as the polar resin.

When the layer (E) includes a polar resin, the content of the polar resin is preferably not less than 50 mass %, more preferably not less than 70 mass %, and still more preferably not less than 80 mass %.

The bonding material that includes the adhesive resin composition of the present invention containing the component (D) can favorably bond a polymethylpentene resin together with other resin such as a polyketone or a polycarbonate. Thus, the laminate described above which has the layer (E), the layer (Y) and the adhesive layer including the bonding material attains good adhesion between the layer (E) and the layer (Y).

For example, the laminate including a layered structure represented by resin layer/adhesive layer/resin layer may be one which includes a layer (G) including a resin having active hydrogen in the main molecular skeleton, the layer (G) being free from resins having no active hydrogen in the main molecular skeleton; a thermoplastic resin layer (Y) including a polymer containing, with respect to all the structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC); and an adhesive layer disposed between the layer (G) and the thermoplastic resin layer (Y) and including the bonding material described hereinabove.

Examples of the resins present in the layer (G) that have active hydrogen in the main molecular skeleton include polar resins such as polyamides, modified fluororesins, acrylic resins, ethylene-vinyl alcohol copolymers, acrylonitrile-butadiene-styrene copolymers (ABS), modified polyolefins, ethylene-acrylic acid copolymers and ethylene-methacrylic acid copolymers. Among these, modified fluororesins are particularly preferable. The resins having active hydrogen in the main molecular skeleton may be used singly, or two or more may be used in combination.

The modified fluororesins are polymers or copolymers having fluorine atoms. Specific examples thereof include ternary fluorocopolymers obtained by copolymerizing tetrafluoroethylene, vinylidene fluoride and hexafluoropropylene, tetrafluoroethylene homopolymers (PTFE) and ethylene tetrafluoroethylene copolymers (ETFE). Examples further include fluororesins obtained by copolymerizing the above polymers with compounds containing a reactive or polar group such as a carbonyl group, an epoxy group, an amine group or a carboxyl group, or by grafting such compounds to the above polymers using a radical generator or the like, and fluororesins terminated with the groups described above. Typical examples of such fluororesins include Fluon LM-ETFE AH (trade name, manufactured by AGC Inc.) and NEOFLON EFEP (trade name, manufactured by DAIKIN INDUSTRIES, LTD.).

Examples of the acrylic resins include acrylic polymers principally including structural units derived from a (meth) acrylic acid ester. In this case, the proportion of the structural units derived from a (meth)acrylic acid ester in the acrylic resin is preferably not less than 50 wt %, and more preferably not less than 80 wt %. Examples of the (meth)acrylic acid esters include (meth)acrylic acid alkyl esters such as methyl (meth)acrylate, ethyl (meth)acrylate, propyl (meth) acrylate, butyl (meth)acrylate and 2-ethylhexyl (meth)acrylate. The (meth)acrylic resins may include a single, or two or more kinds of structural units derived from a (meth) acrylic acid ester. Where necessary, the acrylic resins may further include a single, or two or more kinds of structural units derived from an unsaturated monomer other than the (meth)acrylic acid esters. For example, the acrylic resin may preferably include structural units derived from a nitrile group-containing vinyl monomer such as (meth)acrylonitrile in a proportion of not more than 50 wt %, or may preferably include structural units derived from an aromatic vinyl monomer such as styrene, o-methylstyrene, m-methylstyrene, p-methylstyrene, o-chlorostyrene, m-chlorostyrene or p-chlorostyrene in a proportion of not more than 10 wt %.

The bonding material that includes the adhesive resin composition of the present invention containing the component (D) can favorably bond a polymethylpentene resin together with other resin such as a modified fluororesin. Thus, the laminate described above which has the layer (G), the layer (Y) and the adhesive layer including the bonding material attains good adhesion between the layer (G) and the layer (Y).

Specific examples of the layered structures of the laminates other than those described above include the following configurations in which "adhesive layer" is a layer including the adhesive resin composition, "EVOH" a layer including an ethylene-vinyl alcohol copolymer, "Ny" a layer including a polyamide, "MP" a layer including a 4-methyl-1-pentene polymer, and "PP" a polypropylene resin. Two-layered structures: adhesive layer/EVOH, adhesive layer/Ny, adhesive layer/layer (E), adhesive layer/layer (G), and adhesive layer/MP.

Three-layered structures: adhesive layer/EVOH/adhesive layer, adhesive layer/Ny/adhesive layer, MP/adhesive layer/ EVOH, MP/adhesive layer/Ny, MP/adhesive layer/PP, adhesive layer/layer (E)/adhesive layer, adhesive layer/layer (G)/ adhesive layer, adhesive layer/MP/adhesive layer, layer (E)/ adhesive layer/MP, layer (E)/adhesive layer/layer (G), and MP/adhesive layer/layer (G).

Four-layered structures: MP/adhesive layer/EVOH/adhesive layer, MP/adhesive layer/Ny/adhesive layer, MP/adhesive layer/PP/adhesive layer, adhesive layer/EVOH/adhesive layer/Ny, adhesive layer/EVOH/adhesive layer/MP, layer (E)/adhesive layer/MP/adhesive layer, layer (E)/adhesive layer/layer (G)/adhesive layer, and MP/adhesive layer/layer (G)/adhesive layer.

Five-layered structures: MP/adhesive layer/EVOH/adhesive layer/MP, MP/adhesive layer/Ny/adhesive layer/MP, MP/adhesive layer/PP/adhesive layer/MP, MP/adhesive layer/EVOH/adhesive layer/Ny, MP/adhesive layer/EVOH/ adhesive layer/PP, and MP/adhesive layer/Ny/adhesive layer/PP.

Six-layered structures: MP/adhesive layer/EVOH/adhesive layer/Ny/adhesive layer, MP/adhesive layer/Ny/EVOH/adhesive layer/MP, MP/adhesive layer/PP/adhesive layer/ EVOH/adhesive layer, MP/adhesive layer/layer (E)/adhesive layer/MP, MP/adhesive layer/layer (G)/adhesive layer/ MP, MP/adhesive layer/layer (E)/adhesive layer/layer (G), MP/adhesive layer/layer (G)/adhesive layer/layer (E), layer (E)/adhesive layer/MP/adhesive layer/layer (E), layer (G)/ adhesive layer/MP/adhesive layer/layer (G), and layer (G)/ adhesive layer/MP/adhesive layer/layer (E).

Seven-layered structures: MP/adhesive layer/EVOH/adhesive layer/Ny/adhesive layer/MP, MP/adhesive layer/Ny/ EVOH/Ny/adhesive layer/MP, MP/adhesive layer/EVOH/ adhesive layer/PP/adhesive layer/MP, MP/adhesive layer/ layer (E)/adhesive layer/layer (G)/adhesive layer/MP, MP/adhesive layer/layer (E)/adhesive layer/MP/adhesive layer/layer (E), MP/adhesive layer/layer (G)/adhesive layer/

MP/adhesive layer/layer (G), MP/adhesive layer/layer (G)/adhesive layer/MP/adhesive layer/layer (E), and MP/adhesive layer/layer (E)/adhesive layer/MP/adhesive layer/layer (G).

When the laminate is used as a film or a sheet, the thickness thereof is usually 5 to 1000 μm, preferably 10 to 900 μm, and particularly preferably 10 to 800 μm.

The thickness of the layer including the adhesive resin composition is not particularly limited. When the laminate is used as a film or a sheet, the thickness of the layer is usually in the range of 1 to 800 μm, and preferably 5 to 600 μm. The thickness may vary from that described above when the laminate is used as a bottle or the like.

The laminate may be produced by a known shaping method such as, for example, coextrusion cast film forming, blown-film coextrusion, sheet forming, coating, blowing or extrusion lamination. In particular, the laminate may be suitably produced by a coextrusion cast film forming method or a blown-film coextrusion method.

As described hereinabove, the laminates of the present invention can attain good adhesion between a polymethylpentene resin and a polar resin such as an ethylene-vinyl alcohol copolymer resin or a polyamide resin, or a polyolefin resin such as a polypropylene resin, and can maintain good adhesion between the layers even after being subjected to stretching or other treatment. These characteristics allow the laminates to be used in numerous applications. For example, the laminate of the present invention may be produced into a film including the laminate, and further a bag may be obtained from such a film. In other applications, the laminate of the present invention may be produced into a container including the laminate, or may be produced into a packaging container including the laminate. By virtue of the characteristics described above, the laminates of the present invention may be particularly suitably used in, for example, food packaging containers and food packaging bags.

EXAMPLES

Hereinbelow, the present invention will be described in more detail based on Examples and Comparative Examples. However, it should be construed that the scope of the present invention is not limited to such Examples without departing from the spirit of the present invention. Unless otherwise specified, "parts by mass" is written as "parts".
(Measurement Methods)
In Examples and other experiments, measurements were performed by the following methods.
[Melt Flow Rate (MFR) of Adhesive Resin Compositions]
The melt flow rate of adhesive resin compositions was measured in accordance with ASTM D1238 under the following conditions.
Polyethylene polymer: 190° C. under 2.16 kg load.
Polypropylene polymer: 230° C. under 2.16 kg load.
4-Methyl-1-pentene polymer: 260° C. under 5 kg load.
[Density]
The density was measured in accordance with JIS K7112.
[Number Average Molecular Weight of Carbodiimide Group-Containing Compounds]
The number average molecular weight was measured by gel permeation chromatography (GPC) in tetrahydrofuran solvent (a mobile phase) at a column temperature of 40° C. (polystyrene equivalent, Mw: weight average molecular weight, Mn: number average molecular weight). Polystyrene PS-1 from Agilent Technologies, Inc. (formerly Polymer Laboratories Limited) having molecular weights of $580 \leq Mw \leq 7 \times 10^6$ was used as standard polystyrene.

[Content of Carbodiimide Groups]
The content of carbodiimide groups in Examples and Comparative Examples was calculated from the amount in which a carbodiimide group-containing compound was charged.
[Amount of Maleic Anhydride Grafts]
The amount of maleic anhydride grafts was measured by FT-IR in the following manner. A sample was hot pressed at 250° C. for 3 minutes to form a sheet, which was then analyzed by a transmission method using an infrared spectrophotometer (FT-IR410 manufactured by JASCO Corporation) to measure an infrared absorption spectrum around 1790 $cm^{-1}$. The measurement was conducted under conditions where the resolution was 2 $cm^{-1}$ and the number of scans was 32 times.
[Interlayer Bond Strength]
Laminates and stretched films that were obtained were each cut to a width of 15 mm and tested by a T-peel method using a tensile tester (IM-20ST manufactured by INTESCO Co., Ltd.) to determine the interlayer bond strength at the interface between an adhesive layer and each of a polyamide layer, an EVOH layer, a PP layer, a polyketone layer, a polycarbonate layer, a modified fluororesin layer and a poly-4-methyl-1-pentene layer at a room temperature of 23° C.

The crosshead speed was 300 mm/min.

The unit of the interlayer bond strength is N/15 mm.

The polyolefins used in Examples and Comparative Examples are shown below. These polyolefins were all prepared by polymerization in accordance with a conventional method.

PP-1: Random polypropylene
(melt flow rate (230° C., 2.16 kg load): 7.0 g/10 min, density: 0.900 g/$cm^3$, ethylene content: 5 mol %)

PP-2: Maleic anhydride-modified homopolypropylene
(melt flow rate (230° C., 2.16 kg load): 100 g/10 min, density: 0.900 g/$cm^3$, amount of maleic anhydride grafts: 3.0 mass %)

PP-3: Polypropylene
(melt flow rate (230° C., 2.16 kg load): 5 g/10 min, density: 0.900 g/$cm^3$)

PE-1: Polyethylene polymer
(melt flow rate (190° C., 2.16 kg load): 0.8 g/10 min, density: 0.870 g/$cm^3$, propylene content: 19 mol %)

PMP-1: Propylene-4-methyl-1-pentene copolymer (MFR: 10 g/10 min (230° C., 2.16 kg load), density: 0.838 g/$cm^3$, propylene content: 15 mol %, 4-methyl-1-pentene content: 85 mol %, DSC melting point: 130° C.)

PMP-2: Propylene-4-methyl-1-pentene copolymer (MFR: 10 g/10 min (230° C., 2.16 kg load), density: 0.840 g/$cm^3$, propylene content: 28 mol %, 4-methyl-1-pentene content: 72 mol %, no melting point observed by DSC)

MP-1: Poly-4-methyl-1-pentene (MFR: 26 g/10 min (260° C., 5 kg load), density: 0.833 g/$cm^3$, 4-methyl-1-pentene content: 100 mol %, DSC melting point: 220° C.)

HMV-15CA: Carbodiimide group-containing compound (trade name: CARBODILITE (registered trademark) HMV-15CA manufactured by Nisshinbo Chemical Inc., carbodiimide group equivalent: 262, number average molecular weight: 3050, number of carbodiimide groups in the molecule: 12)

Example 1

<Production of Adhesive Resin Composition>

65 Parts of PP-1, 5 parts of PP-2, 10 parts of PE-1 and 20 parts of PMP-1 were mixed together and were melt-kneaded at 230° C. using a twin-screw kneader (TEX-30 manufactured by The Japan Steel Works, LTD.) to give a bonding material 1 (an adhesive resin composition). The composition obtained had a melt flow rate of 8.1 g/10 min and a density of 0.885 g/cm$^3$.

<Production of 5-Layered Laminate>

A 5-layered laminate having a configuration described below was formed by coextrusion under conditions described below.

With use of a four-component five-layer T-die cast sheet forming machine (manufactured by EDI), a laminate represented by MP-1/bonding material 1/polyamide/bonding material 1/MP-1 was prepared by coextrusion. The polyamide used here was Zytel 45HSB manufactured by DuPont. The die temperature was 275° C., and the sheet was taken off at a speed of 4 m/min while being cooled on a chill roll. The thicknesses of the layers were MP-1/bonding material 1/polyamide/bonding material 1/MP-1=100/20/50/20/100 μm.

<Production of Stretched Film>

The 5-layered laminate obtained above was biaxially stretched with a batch-type stretching machine (manufactured by Bruckner) to give a stretched film. The draw ratio was 2×2 times, and the temperature was 175° C.

<Evaluation of Interlayer Bond Strength of Laminate and Stretched Film>

The laminate and the stretched film produced above were analyzed by the measurement method described hereinabove to measure the interlayer bond strength (MP-1 interlayer bond strength) at the interface between the MP-1 layer and the adhesive layer, and the interlayer bond strength (polyamide interlayer bond strength) at the interface between the polyamide layer and the adhesive layer. The results are described in Table 1.

Examples 2 to 9

Bonding materials, laminates and stretched films were produced in the same manner as in Example 1 according to the formulations described in Table 1. The interlayer bond strength of the laminates and the stretched films obtained was measured in the same manner as in Example 1. The results are described in Table 1.

Comparative Examples 1 to 3

Bonding materials, laminates and stretched films were produced in the same manner as in Example 1 according to the formulations described in Table 1. The interlayer bond strength of the laminates and the stretched films obtained was measured in the same manner as in Example 1. The results are described in Table 1.

Example 10

While using the bonding material 1 obtained in Example 1, a 5-layered laminate which consisted of five layers described below was formed by coextrusion under conditions described below.

<Production of 5-Layered Laminate>

With use of a four-component five-layer T-die cast sheet forming machine (manufactured by EDI), a laminate represented by MP-1/bonding material 1/ethylene-vinyl alcohol copolymer (EVOH)/bonding material 1/PP-1 was prepared by coextrusion. The EVOH used here was EVAL F101B manufactured by KURARAY CO., LTD. The die temperature was 230° C., and the sheet was taken off at a speed of 1 m/min while being cooled on a chill roll. The thicknesses of the layers were MP-1/bonding material 1/EVOH/bonding material 1/PP-1=350/50/50/50/350 μm.

<Evaluation of Interlayer Bond Strength of Laminate>

The laminate produced above was analyzed by the measurement method described hereinabove to measure the interlayer bond strength (MP-1 interlayer bond strength) at the interface between the MP-1 layer and the adhesive layer, the interlayer bond strength (EVOH interlayer bond strength) at the interface between the EVOH layer and the adhesive layer, and the interlayer bond strength (PP interlayer bond strength) at the interface between the PP layer and the adhesive layer. The results are described in Table 1.

Examples 11 to 16

Bonding materials were produced in the same manner as in Example 1 according to the formulations described in Table 1, and laminates were produced in the same manner as in Example 10. The interlayer bond strength of the laminates obtained was measured in the same manner as in Example 10. The results are described in Table 1.

Comparative Examples 4 to 6

Bonding materials were produced in the same manner as in Example 1 according to the formulations described in Table 1, and laminates were produced in the same manner as in Example 10. The interlayer bond strength of the laminates obtained was measured in the same manner as in Example 10. The results are described in Table 1.

Production Example 1

<Production of Polyolefin (a) Having Group Capable of Reacting with Carbodiimide Group>

100 Parts of PP-1 was mixed together with 1 part of maleic anhydride (manufactured by Wako Pure Chemical Industries, Ltd., hereinafter abbreviated as MAH) and 0.25 parts of 2,5-dimethyl-2,5-bis(tert-butylperoxy)hexyne-3 (trade name: PERHEXYNE (registered trademark) 25B manufactured by NOF CORPORATION), and the mixture was extruded using a twin-screw kneader at a cylinder temperature of 220° C., a screw rotational speed of 200 rpm and a throughput of 80 g/min to give a polyolefin (a) that was a maleic anhydride-modified polypropylene (hereinafter, abbreviated as MAH-PP-1). The density of MAH-PP-1 was 0.905 g/cm$^3$.

MAH-PP-1 obtained was dissolved into xylene, and the resultant xylene solution was poured into acetone to reprecipitate purified MAH-PP-1. The amount of maleic anhydride grafts was measured by FT-IR to be 0.7 wt %.

<Production of Carbodiimide-Modified Polyolefin (D)>

100 Parts of MAH-PP-1 produced above and 8.8 parts of carbodiimide group-containing compound HMV-15CA were mixed together, and the mixture was extruded with use of a twin-screw kneader at a cylinder temperature of 250° C., a screw rotational speed of 200 rpm and a throughput of 80 g/min to give pellets of a carbodiimide-modified polyolefin (D) that was a carbodiimide-modified PP (hereinafter, abbreviated as CDI-PP1).

CDI-PP1 obtained had an MFR (230° C., 2.16 kg load) of 130 g/10 min and a density of 0.905 g/cm³. The content of carbodiimide groups calculated from the amount of the carbodiimide group-containing compound charged was 31 mmol/100 g. According to FT-IR analysis of CDI-PP1, the peak assigned to maleic anhydride (1790 cm$^{-1}$) had disappeared. The ratio of the difference (P) between the absorbance assigned to the groups capable of reacting with a carbodiimide group that were present in the polyolefin (a) and the absorbance assigned to the groups capable of reacting with a carbodiimide group that were present in CDI-PP1, to the absorbance (Q) assigned to the groups capable of reacting with a carbodiimide group that were present in the polyolefin (a) was 1, namely, the reaction ratio was 100%.

Example 17

<Production of Bonding Material>

20 Parts of CDI-PP1 produced above, 50 parts of PP-3, 10 parts of PE-1 and 20 parts of PMP-1 were mixed together and extruded using a twin-screw extruder at a cylinder temperature of 250° C., a screw rotational speed of 200 rpm and a throughput of 80 g/min to give a bonding material 13.

<Production of Laminate>

With use of a four-component five-layer T-die cast sheet forming machine (manufactured by EDI), laminates were produced by coextrusion which were represented by MP-1/bonding material 13/polyketone/bonding material 13/MP-1, MP-1/bonding material 13/polycarbonate/bonding material 13/MP-1, and MP-1/bonding material 13/modified fluororesin/bonding material 13/MP-1. The polyketone used here was AKROTEK: PK-HM (product name) manufactured by AKRO-PLASTIC GMBH. The polycarbonate used here was LEXAN 141R manufactured by SABIC. The modified fluororesin used here was LH-8000 manufactured by AGC Inc.

The extruder for the MP-1 layer was 50 mm in diameter and was set at a temperature of 275° C. The extruder for the bonding material 13 was 40 mm in diameter and was set at a temperature of 270° C. The extruder for the polyketone layer was 30 mm in diameter and was set at a temperature of 270° C. The extruder for the polycarbonate layer was 30 mm in diameter and was set at a temperature of 280° C. The extruder for the modified fluororesin layer was 30 mm in diameter and was set at a temperature of 270° C. The temperature of the die portion was 275° C. The sheet was taken off at a speed of 4 m/min while being cooled on a chill roll. The thicknesses of the layers were MP-1/bonding material 13/polyketone or polycarbonate or modified fluororesin/bonding material 13/MP-1=100/20/50/20/100 μm.

<Evaluation of Interlayer Bond Strength of Laminates>

The interlayer bond strength of the laminates produced above was measured. The results are described in Table 2.

Examples 18 to 23

Bonding materials and laminates were produced in the same manner as in Example 17 according to the formulations described in Table 2. The interlayer bond strength of the laminates obtained was measured, the results being described in Table 2.

Comparative Examples 7 to 9

Bonding materials and laminates were produced in the same manner as in Example 17 according to the formulations described in Table 2. The interlayer bond strength of the laminates obtained was measured, the results being described in Table 2.

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Polymers (A) | PP-1 | 65 Parts | 60 Parts | 55 Parts | 50 Parts | 45 Parts | 55 Parts | 45 Parts | 65 Parts |
|  | PP-2 | 5 Parts | 5 Parts | 5 Parts | 5 Parts | 5 Parts | 5 Parts | 5 Parts | 5 Parts |
| Polymer (B) | PE-1 | 10 Parts | 10 Parts | 10 Parts | 10 Parts | 10 Parts | 10 Parts | 20 Parts | 10 Parts |
| Resins (C) | PMP-1 | 20 Parts | 25 Parts | 30 Parts | 35 Parts | 40 Parts |  | 30 Parts |  |
|  | PMP-2 |  |  |  |  |  | 30 Parts |  | 20 Parts |
| Bonding material | Adhesive No. | Adhesive 1 | Adhesive 2 | Adhesive 3 | Adhesive 4 | Adhesive 5 | Adhesive 6 | Adhesive 7 | Adhesive 8 |
|  | MFR (g/10 min) | 8.1 | 8.0 | 8.2 | 8.2 | 8.4 | 8.2 | 6.8 | 8.1 |
|  | Density (g/cm³) | 0.885 | 0.881 | 0.878 | 0.875 | 0.872 | 0.879 | 0.875 | 0.885 |
| MP-1 interlayer bond strength (N/15 mm) | Laminate | 1.4 | 4.5 | 7.2 | Not peeled | Not peeled | Not peeled | 3.0 | 4.1 |
|  | Stretched film | Not peeled | Not peeled | Not peeled | Not peeled | Not peeled | Not peeled | Not peeled | Not peeled |
| Polyamide interlayer bond strength (N/15 mm) | Laminate | Not peeled | 6.1 | 3.7 | 2.1 | 0.8 | 8.2 | 7.0 | Not peeled |
|  | Stretched film | Not peeled | Not peeled | 0.9 | 0.7 | 0.4 | 1.0 | 1.1 | Not peeled |
| EVOH interlayer bond strength (N/15 mm) | Laminate |  |  |  |  |  |  |  |  |
| PP interlayer bond strength (N/15 mm) | Laminate |  |  |  |  |  |  |  |  |

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Polymers (A) | PP-1 | 55 Parts | 65 Parts | 55 Parts | 45 Parts | 55 Parts | 45 Parts | 65 Parts | 55 Parts |
|  | PP-2 | 5 Parts | 5 Parts | 5 Parts | 5 Parts | 5 Parts | 5 Parts | 5 Parts | 5 Parts |
| Polymer (B) | PE-1 | 10 Parts | 10 Parts | 10 Parts | 10 Parts | 10 Parts | 20 Parts | 10 Parts | 10 Parts |
| Resins (C) | PMP-1 |  | 20 Parts | 30 Parts | 40 Parts |  | 30 Parts |  |  |
|  | PMP-2 | 40 Parts |  |  |  | 30 Parts |  | 20 Parts | 40 Parts |

TABLE 1-continued

| Bonding material | Adhesive No. | Adhesive 9 | Adhesive 1 | Adhesive 3 | Adhesive 5 | Adhesive 6 | Adhesive 7 | Adhesive 8 | Adhesive 9 |
|---|---|---|---|---|---|---|---|---|---|
| | MFR (g/10 min) | 8.2 | 8.1 | 8.2 | 8.4 | 8.2 | 6.8 | 8.1 | 8.2 |
| | Density (g/cm$^3$) | 0.872 | 0.885 | 0.878 | 0.872 | 0.879 | 0.875 | 0.885 | 0.872 |
| MP-1 interlayer bond strength (N/15 mm) | Laminate | Not peeled | 15 | 17 | 32 | 30 | 18 | 23 | 40 |
| | Stretched film | Not peeled | | | | | | | |
| Polyamide interlayer bond strength (N/15 mm) | Laminate | 2.8 | | | | | | | |
| | Stretched film | 0.8 | | | | | | | |
| EVOH interlayer bond strength (N/15 mm) | Laminate | | 35.0 | 28.0 | 17.0 | 35.0 | 31.0 | 39.0 | 22.0 |
| PP interlayer bond strength (N/15 mm) | Laminate | | Not peeled | Not peeled | Not peeled | Not peeled | Not peeled | Not peeled | Not peeled |

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Polymers (A) | PP-1 | 85 Parts | 35 Parts | 65 Parts | 85 Parts | 35 Parts | 65 Parts |
| | PP-2 | 5 Parts | 5 Parts | 5 Parts | 5 Parts | 5 Parts | 5 Parts |
| Polymer (B) | PE-1 | 10 Parts | 10 Parts | | 10 Parts | 10 Parts | |
| Resins (C) | PMP-1 | | 50 Parts | 30 Parts | | 50 Parts | 30 Parts |
| | PMP-2 | | | | | | |
| Bonding material | Adhesive No. | Adhesive 10 | Adhesive 11 | Adhesive 12 | Adhesive 10 | Adhesive 11 | Adhesive 12 |
| | MFR (g/10 min) | 7.6 | 8.7 | 10.0 | 7.6 | 8.7 | 10.0 |
| | Density (g/cm$^3$) | 0.897 | 0.866 | 0.881 | 0.897 | 0.866 | 0.881 |
| MP-1 interlayer bond strength (N/15 mm) | Laminate | 0.1 | Not peeled | 1.8 | | | |
| | Stretched film | Not peeled | Not peeled | Not peeled | | | |
| Polyamide interlayer bond strength (N/15 mm) | Laminate | Not peeled | 0.3 | 5.6 | | | |
| | Stretched film | Not peeled | Not peeled | 0.5 | | | |
| EVOH interlayer bond strength (N/15 mm) | Laminate | | | | 45.0 | 0.3 | 1.0 |
| PP interlayer bond strength (N/15 mm) | Laminate | | | | Not peeled | 3 | Not peeled |

TABLE 2

| | | Ex. 17 | Ex. 18 | Ex. 19 | Ex. 20 | Ex. 21 |
|---|---|---|---|---|---|---|
| Carbodiimide-modified polyolefin (D) | CDI-PP | 20 Parts | 20 Parts | 20 Parts | 20 Parts | 20 Parts |
| Propylene resin (A) | PP-3 | 50 Parts | 45 Parts | 40 Parts | 35 Parts | 30 Parts |
| Maleic anhydride-modified polyolefin | MAH-PP-1 | | | | | |
| Ethylene resin (B) | PE-1 | 10 Parts | 10 Parts | 10 Parts | 10 Parts | 10 Parts |
| Thermoplastic resins (C) | PMP-1 | 20 Parts | 25 Parts | 30 Parts | 35 Parts | 40 Parts |
| | PMP-2 | | | | | |
| Bonding material | Adhesive No. | Bonding material 13 | Bonding material 14 | Bonding material 15 | Bonding material 16 | Bonding material 17 |
| | MFR (g/10 min) | 9.2 | 9.5 | 9.8 | 10.2 | 10.5 |
| | Density (g/cm$^3$) | 0.886 | 0.883 | 0.879 | 0.876 | 0.873 |
| | Content of carbodiimide groups (mmol/100 m) | 6.2 | 6.2 | 6.2 | 6.2 | 6.2 |
| Interlayer bond strength (N/15 mm) | MP-1 layer | 2.0 | 5.0 | 7.2 | Not peeled | Not peeled |
| | Polyketone layer | 6.3 | 5.0 | 3.0 | 1.7 | 1.0 |
| | Polycarbonate layer | 4.3 | 3.3 | 2.0 | 1.1 | 0.8 |
| | Modified fluororesin layer | 9.0 | 5.5 | 3.3 | 1.9 | 1.0 |

TABLE 2-continued

|  |  | Ex. 22 | Ex. 23 | Comp. Ex. 7 | Comp. Ex. 8 | Comp. Ex. 9 |
|---|---|---|---|---|---|---|
| Carbodiimide-modified polyolefin (D) | CDI-PP | 20 Parts | 20 Parts | 20 Parts | 20 Parts |  |
| Propylene resin (A) | PP-3 | 40 Parts | 30 Parts | 70 Parts | 20 Parts | 40 Parts |
| Maleic anhydride-modified polyolefin | MAH-PP-1 |  |  |  |  | 20 Parts |
| Ethylene resin (B) | PE-1 | 10 Parts | 20 Parts | 10 Parts | 10 Parts | 10 Parts |
| Thermoplastic resins (C) | PMP-1 |  | 30 Parts |  | 50 Parts | 30 Parts |
|  | PMP-2 | 30 Parts |  |  |  |  |
| Bonding material | Adhesive No. | Bonding material 18 | Bonding material 19 | Bonding material 20 | Bonding material 21 | Bonding material 22 |
|  | MFR (g/10 min) | 9.8 | 8.2 | 8.0 | 11.3 | 9.8 |
|  | Density (g/cm3) | 0.880 | 0.876 | 0.898 | 0.867 | 0.879 |
|  | Content of carbodiimide groups (mmol/100 m) | 6.2 | 6.2 | 6.2 | 6.2 | 0.0 |
| Interlayer bond strength (N/15 mm) | MP-1 layer | Not peeled | 3.0 | 0.1 | Not peeled | 2.0 |
|  | Polyketone layer | 6.7 | 5.7 | 2.5 | 0.1 | 0.1 |
|  | Polycarbonate layer | 4.5 | 3.8 | 1.7 | 0.1 | 0.1 |
|  | Modified fluororesin layer | 7.4 | 6.3 | 5.0 | 0.1 | 0.1 |

The invention claimed is:

1. An adhesive resin composition comprising:
a propylene polymer (A),
an ethylene polymer (B) that is a polymer with 10 mol % or less of comonomer, and
a thermoplastic resin (C) comprising a copolymer containing not less than 60 mol % and not more than 99 mol % of structural units derived from 4-methyl-1-pentene, and not less than 1 mol % and not more than 40 mol % of structural units derived from a C2-C20 α-olefin other than 4-methyl-1-pentene, the structural units derived from 4-methyl-1-pentene and the structural units derived from a C2-C20 α-olefin other than 4-methyl-1-pentene representing in total 100 mol % of the copolymer, the thermoplastic resin (C) showing a melting point Tm of not more than 199° C. or showing substantially no melting point as analyzed with a differential scanning calorimeter (DSC),
the total of the components (A), (B) and (C) taken as 100 parts by mass including 45 to 75 parts by mass of the component (A), 5 to 20 parts by mass of the component (B), and 15 to 45 parts by mass of the component (C).

2. The adhesive resin composition according to claim 1, wherein the propylene polymer (A) contains 75 to 100 mol % of structural units derived from propylene.

3. The adhesive resin composition according to claim 1, wherein part or all of the propylene polymer (A), the ethylene polymer (B), and the copolymer included in the thermoplastic resin (C) are graft-modified with an unsaturated carboxylic acid and/or a derivative thereof.

4. A laminate comprising:
a thermoplastic resin layer (X),
a thermoplastic resin layer (Y) comprising a polymer containing, with respect to all structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC), and
an adhesive layer disposed between the thermoplastic resin layer (X) and the thermoplastic resin layer (Y) and comprising the adhesive resin composition described in claim 1.

5. The laminate according to claim 4, wherein the layer (X) is a layer comprising a polypropylene.

6. The laminate according to claim 4, wherein the layer (X) is a layer comprising a resin containing an OH group or an NH group.

7. The laminate according to claim 4, wherein the layer (X) is a layer comprising an ethylene-vinyl alcohol copolymer.

8. The laminate according to claim 4, wherein the layer (X) is a layer comprising a resin containing a polyamide.

9. The laminate according to claim 4, which is formed by a coextrusion cast film forming method.

10. The laminate according to claim 4, which is formed by a blown-film coextrusion method.

11. A food packaging container or food packaging bag produced using the laminate described in claim 4.

12. The adhesive resin composition according to claim 1, wherein the composition further comprises a carbodiimide-modified polyolefin (D), and the total of the components (A), (B), (C) and (D) taken as 100 parts by mass includes 10 to 65 parts by mass of the component (A), 5 to 20 parts by mass of the component (B), 15 to 45 parts by mass of the component (C), and 5 to 30 parts by mass of the component (D).

13. The adhesive resin composition according to claim 12, which includes carbodiimide groups in an amount of 0.1 to 50 mmol per 100 g.

14. A laminate comprising:
a layer (E) comprising a resin having no active hydrogen in a main molecular skeleton,
a thermoplastic resin layer (Y) comprising a polymer containing, with respect to all structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC), and
an adhesive layer disposed between the layer (E) and the thermoplastic resin layer (Y) and comprising the adhesive resin composition described in claim 12.

15. The laminate according to claim 14, wherein the resin having no active hydrogen in the main molecular skeleton is a polyketone.

16. The laminate according to claim 15, wherein the polyketone is a linear polymer in which carbonyl groups, and divalent organic groups derived from an ethylenically unsaturated compound or divalent organic groups formed by linking of two or more of the organic groups are bonded alternately.

17. The laminate according to claim 15, wherein the polyketone is an ethylene-carbon monoxide copolymer or an ethylene-propylene-carbon monoxide copolymer.

18. The laminate according to claim 14, wherein the resin having no active hydrogen in the main molecular skeleton is a polar resin.

19. The laminate according to claim 18, wherein the polar resin is a polycarbonate.

20. A laminate comprising:
- a layer (G) comprising a resin having active hydrogen in a main molecular skeleton, the layer (G) being free from resins having no active hydrogen in a main molecular skeleton,
- a thermoplastic resin layer (Y) comprising a polymer containing, with respect to all structural units, 90 mol % or more and 100 mol % or less of structural units derived from 4-methyl-1-pentene, and 0 mol % or more and 10 mol % or less of structural units derived from an α-olefin other than 4-methyl-1-pentene, the thermoplastic resin layer (Y) having a melting point Tm of not less than 200° C. as measured with a differential scanning calorimeter (DSC), and
- an adhesive layer disposed between the layer (G) and the thermoplastic resin layer and comprising the adhesive resin composition described in claim 12.

21. The laminate according to claim 20, wherein the resin having active hydrogen in the main molecular skeleton is a modified fluororesin.

\* \* \* \* \*